United States Patent
Yoon et al.

(10) Patent No.: US 11,936,771 B2
(45) Date of Patent: Mar. 19, 2024

(54) DEVICE AND METHOD FOR GENERATING SCRAMBLED TIMESTAMP SEQUENCE (STS) IN ULTRA WIDE BAND (UWB) COMMUNICATION SYSTEM

(71) Applicant: Samsung Electronics Co., Ltd., Suwon-si (KR)

(72) Inventors: Kangjin Yoon, Suwon-si (KR); Sungkyu Cho, Suwon-si (KR); Sehee Han, Suwon-si (KR); Moonseok Kang, Suwon-si (KR); Hyunchul Kim, Suwon-si (KR); Yi Yang, Suwon-si (KR); Sungjun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/783,119

(22) PCT Filed: Dec. 4, 2020

(86) PCT No.: PCT/KR2020/017682
§ 371 (c)(1),
(2) Date: Jun. 7, 2022

(87) PCT Pub. No.: WO2021/118175
PCT Pub. Date: Jun. 17, 2021

(65) Prior Publication Data
US 2023/0014199 A1    Jan. 19, 2023

Related U.S. Application Data

(60) Provisional application No. 62/945,989, filed on Dec. 10, 2019.

(51) Int. Cl.
H04L 29/06    (2006.01)
G01S 13/02    (2006.01)
(Continued)

(52) U.S. Cl.
CPC ........ *H04L 9/0668* (2013.01); *G01S 13/0209* (2013.01); *H04L 9/0631* (2013.01);
(Continued)

(58) Field of Classification Search
CPC ... H04L 9/0668; H04L 9/0869; H04L 9/3297; H04L 2209/80; G01S 13/0209
See application file for complete search history.

(56) References Cited

U.S. PATENT DOCUMENTS

2005/0084032 A1    4/2005    Rosen et al.
2007/0242729 A1    10/2007    Quinn et al.
(Continued)

FOREIGN PATENT DOCUMENTS

KR    10-2009-0083957 A    8/2009

OTHER PUBLICATIONS

Kang et al. "Minuet: Multimodal Interaction with an Internet of Things," Oct. 2019. (Year: 2019).*
(Continued)

*Primary Examiner* — Shawnchoy Rahman
(74) *Attorney, Agent, or Firm* — Jefferson IP Law, LLP

(57) ABSTRACT

Provided is a method of an electronic device for performing ultra wide band (UWB) communication. The method includes receiving upper bit information including pre-set at least one parameter via a UWB command interface (UCI), obtaining slot count information and key information including a constant key value, and performing static scrambled timestamp sequence (STS) generation, based on the upper bit information, the slot count information, and the key information.

11 Claims, 10 Drawing Sheets

(51) Int. Cl.
*H04L 9/06* (2006.01)
*H04L 9/08* (2006.01)
*H04L 9/32* (2006.01)
*H04W 12/03* (2021.01)

(52) U.S. Cl.
CPC .......... *H04L 9/0822* (2013.01); *H04L 9/0869* (2013.01); *H04L 9/3297* (2013.01); *H04W 12/03* (2021.01); *H04L 2209/80* (2013.01)

(56) References Cited

U.S. PATENT DOCUMENTS

| | | |
|---|---|---|
| 2011/0193739 A1 | 8/2011 | Strauch et al. |
| 2014/0307684 A1 | 10/2014 | Cha et al. |
| 2018/0049196 A1* | 2/2018 | Gupta ................... H04L 5/0073 |
| 2019/0013937 A1 | 1/2019 | Leong et al. |
| 2021/0099863 A1* | 4/2021 | Naguib ................. H04W 12/63 |

OTHER PUBLICATIONS

Shankland, Stephen. Apple built UWB into the iPhone 11. Here's what you need to know (FAQ). Sep. 14, 2019. (Year: 2019).*
Frank Leong et al., HRP UWB SRDEV PPDU Text Contribution, IEEE P802.15-18-0286-01-004z, Jul. 5, 2018.
Jack Lee et al., IEEE 802.15.4z MAC, IEEE P802.15-19-0034-00-004z, Jan. 14, 2019.
International Search Report dated Mar. 11, 2021, issued in International Application No. PCT/KR2020/017682.
LAN/MAN Standards Committee of the IEEE Computer, P802.15.4z™/D00 Draft Standard for Low-Rate Wireless Networks Amendment: Enhanced Ultra Wide-Band(UWB) Physical Layers (PHYs) and Associated Ranging Techniques, Feb. 22, 2019.
Frank Leong et al., HRP UWB SRDEV PPDU Text Contribution, IEEE P802.15-18-0286-01-004Z, Jul. 6, 2018.
European Search Report dated Nov. 29, 2022, issued in European Application No. 20898062.3.

* cited by examiner

DEVICE AND METHOD FOR GENERATING SCRAMBLED TIMESTAMP SEQUENCE (STS) IN ULTRA WIDE BAND (UWB) COMMUNICATION SYSTEM

TECHNICAL FIELD

The disclosure relates to an apparatus and method for generating a scrambled timestamp sequence (STS) in an ultra wide band (UWB) communication system.

BACKGROUND ART

The Internet has evolved from a human-based connection network, where humans create and consume information, to an Internet of things (IoT) network, where distributed configurations, such as objects, exchange information with each other to process the information. Internet of everything (IoE) technology, in which IoT technology is combined with technology for processing big data through a connection with a cloud server, is emerging. To implement IoT, technical elements, such as sensing technology, a wired/wireless communication and network infrastructure, service interface technology, and security technology, are required. Recently, technologies such as a sensor network for a connection between objects, machine to machine (M2M), and machine type communication (MTC) are being studied.

In an IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various services are able to be provided due to the development of wireless communication systems, and thus, there is need for methods of effectively providing such services. For example, in medium access control (MAC), ranging technology of measuring a distance between electronic devices by using an ultra wide band (UWB) may be used. The UWB is a wireless communication technology of using an ultra wide frequency band equal to or greater than several GHz in a baseband, without using wireless carriers.

A security issue may occur when an external attacker accesses UWB communication while UWB ranging is performed between pre-agreed electronic devices. To reinforce security of the UWB communication, a scrambled timestamp sequence (STS) function for preventing the external attacker from accessing or manipulating the UWB communication via encoding, random number generation, or another technique may be used.

Meanwhile, in a UWB communication system, an electronic device may need to effectively generate an STS.

DISCLOSURE

Technical Solution

According to an embodiment, provided are an electronic device and method for performing static scrambled timestamp sequence (STS) generation in an ultra wide band (UWB) communication system.

BEST MODE

Figure 1:
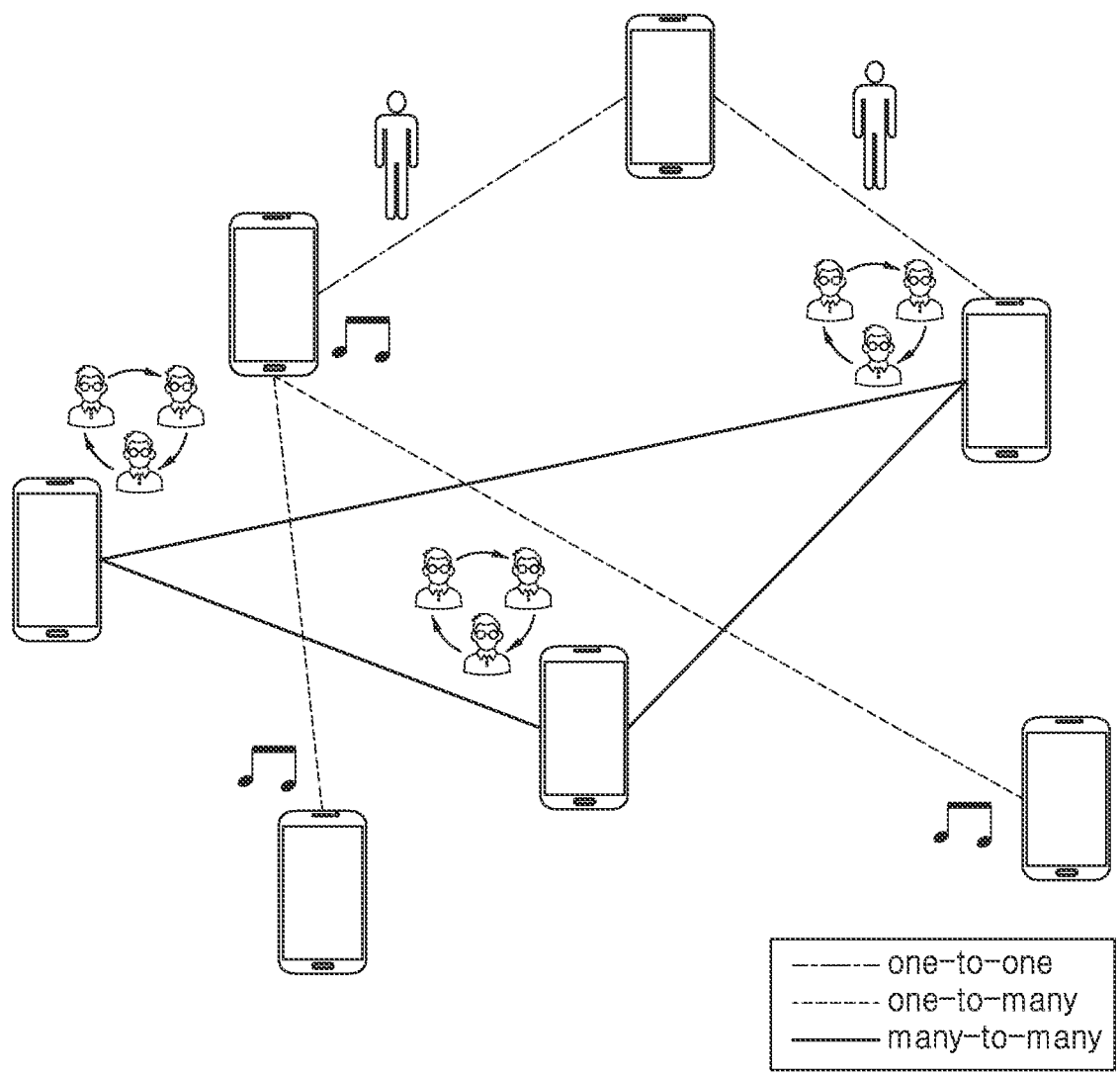
FIG. 1 is a diagram for describing a general device-to-device (D2D) communication procedure.

According to an embodiment of the disclosure, a method performed by an electronic device for performing ultra wide band (UWB) communication, includes receiving upper bit information including pre-set at least one parameter via a UWB command interface (UCI), obtaining slot count information and key information including a constant key value, and performing static scrambled timestamp sequence (STS) generation, based on the upper bit information, the slot count information, and the key information.

According to an embodiment, the upper bit information may include a parameter indicating an identification of a vendor.

According to an embodiment, the slot count information may include a count value increasing by a value of 1 for each slot.

According to an embodiment, the count value may be initialized for each round.

According to an embodiment, a deterministic random bit generator (DRBG) may be used for the static STS generation, and an input of the DRBG may include the upper bit information, the slot count information, and the key information.

According to an embodiment, the input of the DRBG may further include STS count information associated with a number of outputs of the DRBG.

According to an embodiment, the STS count information may be initialized for each slot.

According to an embodiment, STSs respectively corresponding to a plurality of slots included in each of a plurality of rounds may be different from each other, and a plurality of first STSs associated with a first round and a plurality of second STSs associated with a second round may be the same.

According to an embodiment of the disclosure, an electronic device for performing ultra wide band (UWB) communication, includes at least one processor configured to receive upper bit information including pre-set at least one parameter via a UWB command interface (UCI), obtain slot count information and key information including a constant key value, and perform static scrambled timestamp sequence (STS) generation, based on the upper bit information, the slot count information, and the key information.

According to an embodiment, the upper bit information may include a parameter indicating an identification of a vendor.

According to an embodiment, the slot count information may include a count value increasing by a value of 1 for each slot.

According to an embodiment, the count value may be initialized for each round.

According to an embodiment, the at least one processor may include a deterministic random bit generator (DRBG) for the static STS generation, and an input of the DRBG may include the upper bit information, the slot count information, and the key information.

According to an embodiment, the input of the DRBG may further include STS count information associated with a number of outputs of the DRBG, and the STS count information may be initialized for each slot.

According to an embodiment, STSs respectively corresponding to a plurality of slots included in each of a plurality of rounds may be different from each other, and a plurality of first STSs associated with a first round and a plurality of second STSs associated with a second round may be the same.

MODE FOR INVENTION

Hereinafter, embodiments of the disclosure will be described in detail with reference to the accompanying drawings such that one of ordinary skill in the art may easily implement the disclosure. However, the disclosure may be implemented in various different forms and is not limited to the embodiments of the disclosure described herein. Also, in the drawings, parts irrelevant to the description are omitted in order to clearly describe the disclosure, and like reference numerals designate like elements throughout the specification.

Terms used in the disclosure are described as general terms currently used in consideration of functions described in the disclosure, but the terms may have different meanings according to an intention of one of ordinary skill in the art, precedent cases, or the appearance of new technologies. Thus, the terms used herein should not be interpreted only by its name, but have to be defined based on the meaning of the terms together with the description throughout the specification.

While such terms as "first", "second", etc., may be used to describe various components, such components must not be limited to the above terms. The above terms are used only to distinguish one component from another.

Also, the terms used in the disclosure are only used to describe specific embodiments of the disclosure, and are not intended to limit the disclosure. An expression used in the singular encompasses the expression in the plural, unless it has a clearly different meaning in the context. Throughout the specification, when a part is "connected" to another part, the part may not only be "directly connected" to the other part, but may also be "electrically connected" to the other part with another element in between. In addition, when a part "includes" a certain component, the part may further include another component instead of excluding the other component, unless otherwise stated.

"The" and similar directives used throughout the present specification may indicate both singular and plural. Also, unless there is a clear description of an order of operations describing a method according to the disclosure, the operations described may be performed in a suitable order. The disclosure is not limited by the order of description of the described operations.

The phrases "an embodiment" or the like appearing in various places in this specification are not necessarily all referring to the same embodiment.

An embodiment of the disclosure may be represented by functional block configurations and various processing operations. Some or all of these functional blocks may be implemented by various numbers of hardware and/or software configurations that perform particular functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented by algorithms executed in one or more processors. In addition, the disclosure may employ general techniques for electronic environment setting, signal processing, and/or data processing.

In addition, a connection line or a connection member between components shown in drawings is merely a functional connection and/or a physical or circuit connection. In an actual device, connections between components may be represented by various functional connections, physical connections, or circuit connections that are replaceable or added.

Generally, a wireless sensor network technology is largely classified into a wireless local area network (WLAN) technology and a wireless personal area network (WPAN) technology, depending on a recognition distance. Here, WLAN is a technology based on IEEE 802.11, and is able to access a backbone network within a radius of 100 m. Also, WPAN is a technology based on IEEE 802.15, and includes Bluetooth, ZigBee, and ultra wide band (UWB). A wireless network where such a wireless network technology is implemented may include a plurality of communication electronic devices. Here, the plurality of communication electronic devices perform communication in an active period by using a single channel. In other words, the communication electronic devices may collect a packet in the active period and transmit the collected packet.

The UWB may denote a short-distance high-speed wireless communication technology using a wide frequency band equal to or greater than several GHz in a baseband state, low spectrum density, and a short pulse width (1 to 4 nsec). The UWB may denote a band itself to which UWB communication is applied. Hereinafter, a ranging method between electronic devices is described based on a UWB communication method, but this is only an example and various wireless communication technologies may be used in practice.

An electronic device according to embodiments of the disclosure may include a fixed terminal or a mobile terminal implemented as a computer device, and may communicate with another device and/or server by using a wireless or wired communication method. For example, examples of the electronic device may include a smart phone, a mobile terminal, a laptop computer, a digital broadcasting terminal, a personal digital assistant (PDA), a portable multimedia player (PMP), a navigation device, a slate personal computer (PC), a tablet PC, a desktop computer, a digital television (TV), a refrigerator, an artificial intelligence speaker, a wearable device, a protector, a smart key, a smart car, a printer, a vehicle console, and a control device controlling at least some functions of a vehicle, but are not limited thereto.

Hereinafter, the disclosure will be described in detail with reference to accompanying drawings.

FIG. 1 is a diagram for describing a general device-to-device (D2D) communication procedure.

D2D communication denotes a method by which electronic devices geographically close to each other directly communicate with each other without going through an infrastructure such as a base station. As shown in FIG. 1, the electronic devices may communicate in a one-to-one, one-to-many, or many-to-many manner. The D2D communication may use an unlicensed frequency band such as UWB, Wi-Fi direct, or Bluetooth. Alternatively, the D2D communication may increase a frequency utilization efficiency of a cellular system by using a licensed frequency band. The D2D communication may be limitedly used as a term referring to communication between things or machines, but in the disclosure, the D2D communication may include any communication between not only simple electronic devices having a communication function, but also electronic devices of various types having a communication function, such as a smart phone or a personal computer.

Figure 2:
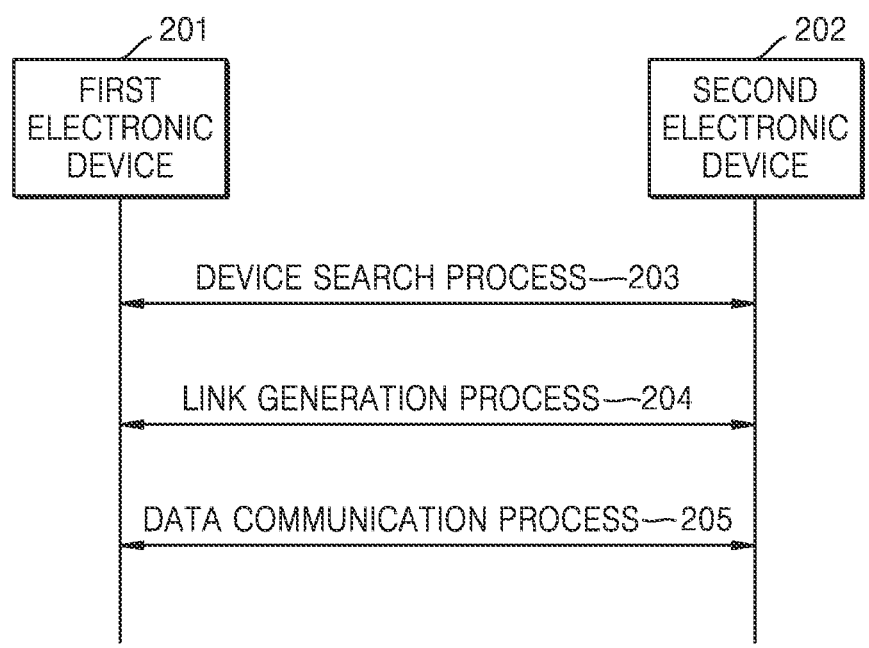
FIG. 2 is a diagram of communication processes of a plurality of electronic devices.

FIG. 2 is a diagram of communication processes of a plurality of electronic devices.

A first electronic device 201 and a second electronic device 202 may perform a device search process 203, a link generation process 204, and a data communication process 205.

In the device search process 203, each of the first electronic device 201 and the second electronic device 202 may search peripheral electronic devices for other electronic devices capable of D2D communication. Accordingly, each of the first electronic device 201 and the second electronic device 202 may determine whether to generate a link for the D2D communication. For example, the first electronic device 201 may transmit a search signal for the second electronic device 202 to find the first electronic device 201. Also, the first electronic device 201 may receive a search signal transmitted by the second electronic device 202 to identify that other electronic devices capable of D2D communication are within a D2D communication range.

In the link generation process 204, each of the first electronic device 201 and the second electronic device 202 may generate a link for data transmission with an electronic device to which data is to be transmitted from among electronic devices found in the device search process 203. For example, the first electronic device 201 may generate a link for data transmission to the second electronic device 202 found in the device search process 203.

In the data communication process 205, each of the first electronic device 201 and the second electronic device 202 may transmit/receive data to/from devices to which the link is generated in the link generation process 204. For example, the first electronic device 201 may transmit/receive data to/from the second electronic device 202 via the link generated in the link generation process 204.

Figure 3:
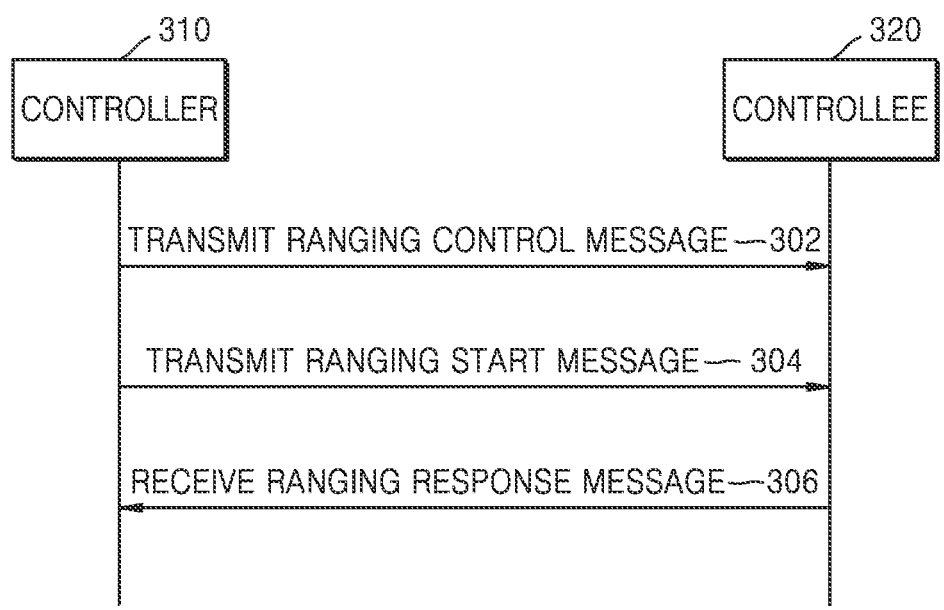
FIG. 3 illustrates an operation method of an ultra wide band (UWB) ranging system including a controller and a controllee.

FIG. 3 illustrates an operation method of a UWB ranging system including a controller and a controllee.

When ranging is performed between two electronic devices, one of the two electronic devices may be a controller and the other one may be a controllee. For example, the first electronic device 201 and the second electronic device 202 of FIG. 2 may respectively correspond to a controller 310 and a controllee 320 of FIG. 3.

In operation 302, the controller 310 may control ranging by transmitting a ranging control message to the controllee 320, and define ranging parameters. The ranging control message may be a data frame carrying an advanced ranging control information element (ARC IE). The controllee 320 may be a device using the ranging parameters in the ranging control message received from the controller 310.

In operation 304, the controller 310 may transmit a ranging start message to the controllee 320. The ranging start message may be a first message transmitted to start a ranging exchange.

In operation 306, the controllee 320 may transmit, to the controller 310, a ranging response message in response to the ranging start message received from the controller 310.

Although not illustrated, the controller 310 may end the ranging exchange according to the ranging start message by transmitting a ranging end message to the controllee 320.

A device transmitting the ranging start message may be referred to as an initiator and a device responding to the ranging start message may be referred to as a responder. One of the controller 310 and the controllee 320 may be an initiator and the other one may be a responder, according to the ranging control message transmitted by the controller 310. Accordingly, in FIG. 3, the controller 310 is described to be an initiator, but an embodiment is not limited thereto. The controllee 320 may be an initiator and the controller 310 may be a responder.

A ranging block denotes a period for ranging. The ranging block includes a plurality of ranging rounds. The ranging round denotes a period required for one complete range measurement cycle between a pair of ranging devices participating in a ranging exchange to be completed. The ranging round includes a plurality of ranging slots. The ranging slot denotes a period for one ranging frame transmission.

For example, the transmitting of the ranging control message (operation 302), the transmitting of the ranging start message (operation 304), and the receiving of the ranging response message (operation 306) may be performed within a ranging round. Hereinafter, a block, a round, and a slot respectively denote a ranging block, a ranging round, and a ranging slot.

Figure 4:
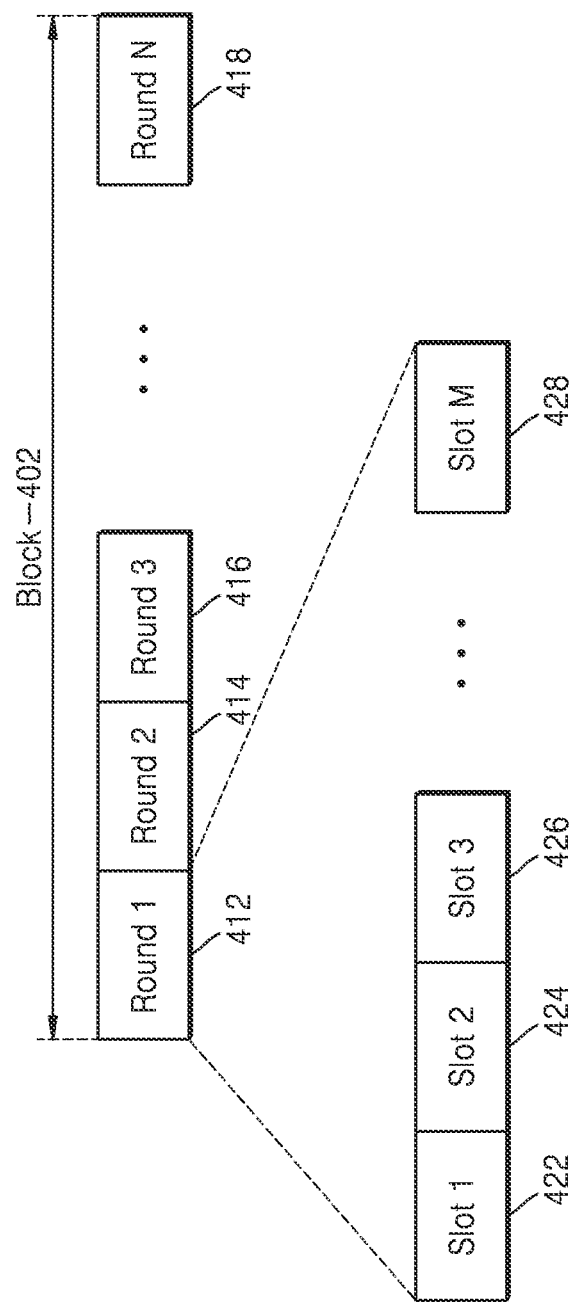
FIG. 4 illustrates an example of a block and round structure that may be used in a ranging system.

FIG. 4 illustrates an example of a block and round structure that may be used in a ranging system.

Referring to FIG. 4, a block 402 may include N rounds 412 through 418, and each round may include M slots. For example, a first round 412 may include M slots 422 through 428. Here, N and M are each a natural number.

When a controller and a controllee performs UWB communication, the controllee may operate under control by the controller. When an external attacker that is not an authorized controller accesses the UWB communication and controls the controllee, the external attacker may manipulate UWB ranging between the controller and the controllee. Accordingly, to prevent the UWB ranging between the controller and the controllee from being disturbed by the external attacker, security of a UWB communication system needs to be secured.

In detail, when the first electronic device 201 and the second electronic device 202 respectively operate as the controller and the controllee of the UWB communication system, a procedure for authenticating that the first electronic device 201 and the second electronic device 202 are mutually authorized is essentially required.

According to an embodiment, the first electronic device 201 and the second electronic device 202 may perform an authentication procedure described above via UWB security ranging. For the UWB security ranging, the first electronic device 201 and the second electronic device 202 may each generate a scrambled timestamp sequence (STS). For example, different STSs may be generated for each of the M slots 422 through 428 of FIG. 4.

The STS denotes a random number used to prevent an external attacker from disturbing a UWB system by accessing UWB communication. For example, the first electronic device 201 and the second electronic device 202 may respectively generate a first STS and a second STS by using a random number generator. For example, according to an embodiment, a deterministic random bit generator (DRBG) may be used as the random number generator. The first electronic device 201 may transmit, to the second electronic device 202, information about the generated first STS, and the second electronic device 202 may compare the first STS and the second STS generated by the second electronic device 202, based on the received information about the first STS.

For convenience of description, it has been described that the first electronic device 201 and the second electronic device 202 are respectively an STS transmitter and an STS receiver, but the first electronic device 201 and the second electronic device 202 may respectively be an STS receiver and an STS transmitter.

When the first STS and the second STS has a same value, the second electronic device 202 may identify the first electronic device 201 as an authorized device, and perform UWB ranging with the first electronic device 201. An STS that has been transmitted once and used for verification is not reused, and the first electronic device 201 and the second electronic device 202 need to generate a new STS again by using the DRBG every time an STS is to be transmitted.

An STS may be generated by using a DRBG as disclosed in IEEE 802.15.4z regarding UWB ranging control and position estimation, and a structure of the DRBG will be below described with reference to FIG. 5.

Figure 5:
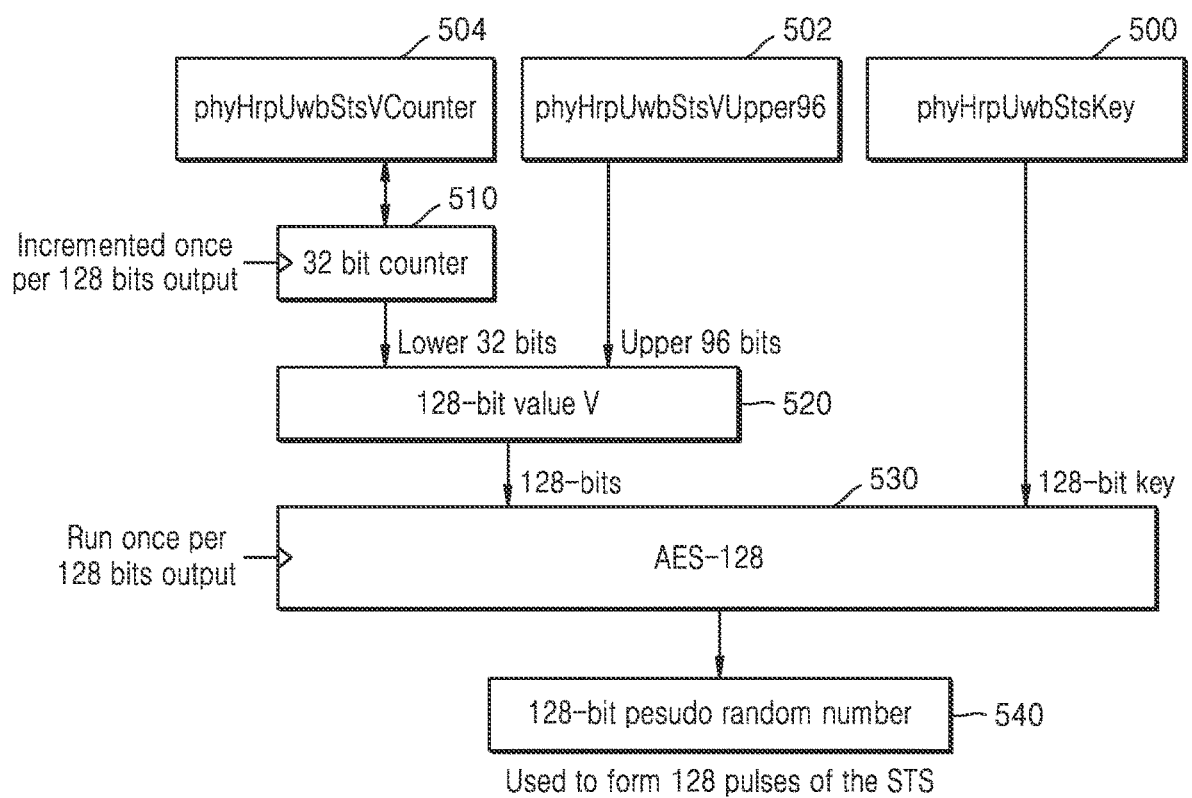
FIG. 5 is a diagram showing a structure of a deterministic random bit generator (DRBG) for generating a scrambled timestamp sequence (STS).

FIG. 5 is a diagram showing a structure of a DRBG for generating an STS.

Referring to FIG. 5, the DRBG may generate the STS, based on phyHrpUwbStsVCounter 504, phyHrpUwbStsVUpper96 502, and phyHrpUwbStsKey 500. The DRBG generates a 128-bit pseudo random number 540 indicating a random number having a 128-bit length for each repetition, and the 128-bit pseudo random number 540 may be used to form 128 pseudo randomized pulses of the STS.

In detail, the DRBG may generate a seed indicating information required to generate the STS, and the STS based on the seed. For example, the DRBG may use an advanced encryption standard 128 (AES-128) 530 as an algorithm for generating the STS based on the seed. Only valid electronic devices are able to know a correct seed value, and the seed may include a 128-bit value V 520 indicating data of a 128-bit length for STS generation, and the phyHrpUwbStsKey 500 indicating a key of a 128-bit length. As described below, the phyHrpUwbStsKey 500 may be set in different values depending on whether the STS generation is dynamic STS generation or fixed STS generation.

The DRBG may generate the 128-bit pseudo random number 540 by using the 128-bit value V 520 and the phyHrpUwbStsKey 500 as input values of the AES-128 530, and generate the STS based on the 128-bit pseudo random number 540.

The 128-bit value V 520 may include the phyHrpUwbStsVCounter 504 of a 32-bit length and the phyHrpUwbStsVUpper96 502 of a 96-bit length.

The phyHrpUwbStsVUpper96 502 corresponds to upper 96 bits of the 128-bit value V 520, and the phyHrpUwbStsVCounter 504 may correspond to lower 32 bits of the 128-bit value V 520. As described below, the phyHrpUwbStsVCounter 504 and the phyHrpUwbStsVUpper96 502 may be set in different values depending on whether STS generation is dynamic STS generation or fixed STS generation.

Whenever the 128-bit pseudo random number 540 is output, i.e., for each repetition of DRBG, a 32-bit counter 510 may increase a value of the phyHrpUwbStsVCounter 504. When generating a following STS, the DRBG may use, as an input of the AES-128 530, the phyHrpUwbStsVCounter 504 including a value increased from that used to generate the current STS.

According to an embodiment, the first electronic device 201 and the second electronic device 202 may each perform dynamic STS generation. STS generation may be performed by both the first electronic device 201 and the second electronic device 202, and an electronic device hereinbelow may refer to both the first electronic device 201 and the second electronic device 202. The electronic device may perform dynamic STS generation by using the DRBG described with reference to FIG. 5, and the dynamic STS generation will be described below in detail with reference to FIG. 6.

In FIG. 5, an example in which an STS is generated by using the phyHrpUwbStsVCounter 504, the phyHrpUwbStsVUpper96 502, and the phyHrpUwbStsKey 500 as inputs of the DRBG has been described. However, terms used regarding parameters are not limited to examples shown in FIG. 5, and are only names for distinguishing the parameters. Thus, configurations having different names but performing same functions do not depart from the scope of the disclosure.

Figure 6:
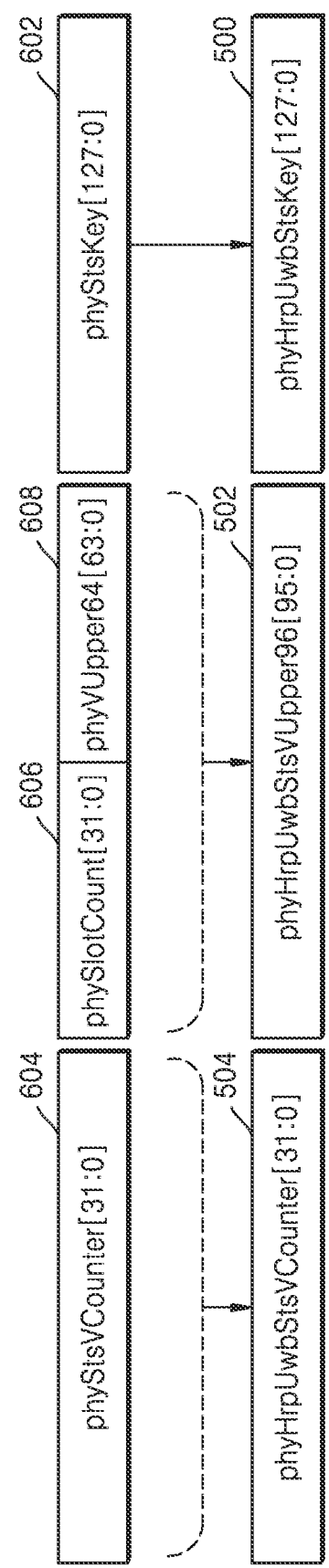
FIG. 6 is a diagram for describing a parameter used for dynamic STS generation, according to an embodiment of the disclosure.

FIG. 6 is a diagram for describing a parameter used for dynamic STS generation, according to an embodiment of the disclosure.

As shown in FIG. 6, the phyHrpUwbStsVCounter 504, the phyHrpUwbStsVUpper96 502, and the phyHrpUwbStsKey 500 of FIG. 5 may be indicated as phyStsVCounter 604, phySlotCount 606, phyVUpper64 608, and phyStsKey 602 of FIG. 6.

Inputs of a DRBG for the dynamic STS generation may include the phyStsVCounter 604, phySlotCount 606, phyVUpper64 608, and phyStsKey 602. The phyStsVCounter 604 is a parameter indicating a counter value increasing for each repetition of the DRBG, and may be mapped to the phyHrpUwbStsVCounter 504 described above with reference to FIG. 5. Like the phyHrpUwbStsVCounter 504, the phyStsVCounter 604 may include data of 32 bits.

The phyStsVCounter 604, the phySlotCount 606, the phyVUpper64 608, and the phyStsKey 602 are only names for distinguishing factors, and configurations having different names but performing same functions do not depart from the scope of the disclosure.

The phySlotCount 606 is a parameter indicating a counter value increasing for each slot, and may include data of 32 bits. Regarding the dynamic STS generation, the counter value of phySlotCount 606 may increase for each slot after being initialized to a pre-determined value at a point of ranging session. The phySlotCount 606 may be referred to as cryptoStsIndex.

The phyVUpper64 608 may be a parameter set to a pre-determined value, and may include data of 64 bits. For example, the phyVUpper64 608 may be set to secDerivedAuthenticationIv[127-64] that is a parameter generated during a last key deviation process.

Data of 96 bits including consecutive values of the phyVUpper64 608 and phySlotCount 606 may be mapped to the phyHrpUwbStsVUpper96 502 described above with reference to FIG. 5. The phyVUpper64 608 may correspond to upper 64 bits of the phyHrpUwbStsVUpper96 502, and the phySlotCount 606 may correspond to lower 32 bits of the phyHrpUwbStsVUpper96 502.

The phyStsKey 602 may be a parameter indicating a pre-generated key value, and may include data of 128 bits. For example, an electronic device may include a security element allowing only an access of an application limited in the electronic device, and generate a key value from the security element for security ranging. The phyStsKey 602 may be set to correspond to secDerivedAuthenticationKey that is a parameter including a key value generated via a key deviation process performed by the security element. The phyStsKey 602 may be mapped to the phyHrpUwbStsKey 500 described above with reference to FIG. 5.

The phyStsVCounter 604 may be mapped to the phyHrpUwbStsVCounter 504, the phySlotCount 606 and the phyVUpper64 608 may be mapped to the phyHrpUwbStsVUpper96 502, the phyStsKey 602 may be mapped to the phyHrpUwbStsKey 500, and the electronic device may perform the dynamic STS generation by using the DRBG according to FIG. 5 after initializing an input value of the DRBG to a value mapped according to the mapping relationship described above.

Regarding a dynamic STS, an STS is generated by using a key value generated via a security element, and thus stronger security may be provided. Also, the phySlotCount 606 denotes a counter value increasing for each slot, and in the dynamic STS, the counter value of the phySlotCount 606 is not initialized even when a new round starts. Thus, different STSs may be generated for each slot regardless of a round, such that security may be reinforced.

However, large overhead may occur for the security element of the electronic device to generate a key value every time to generate an STS, and complexity of the electronic device may increase and performance thereof may deteriorate. Also, because an STS generated for each round is different according to the phySlotCount 606 increasing for each slot, regardless of a round, a time required for processing may increase.

Meanwhile, an electronic device that does not include a security element may use a preamble instead of an STS, for UWB ranging. However, UWB ranging not using an STS has low reliability of ranging compared to UWB ranging using an STS.

Figure 7:
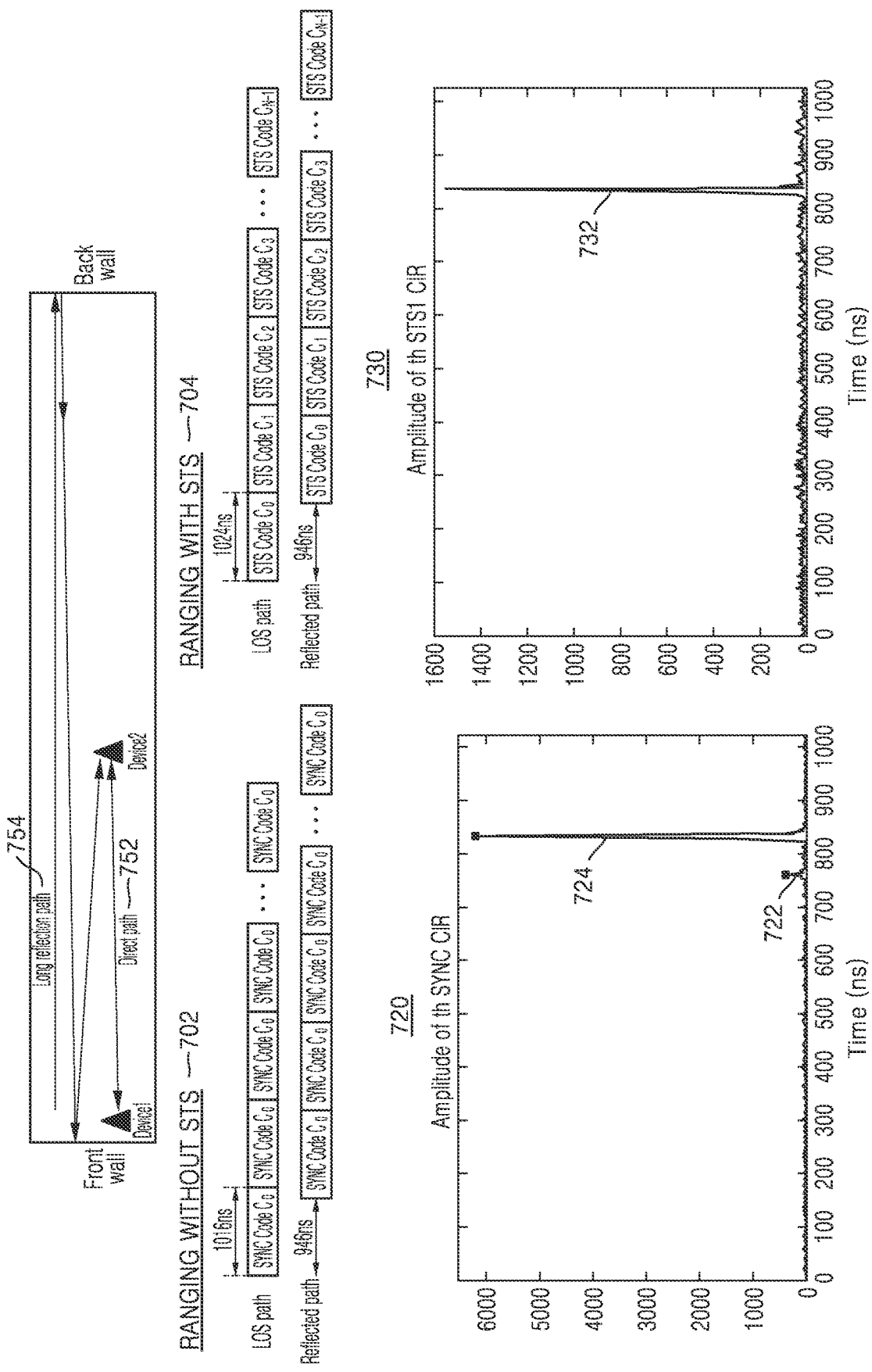
FIG. 7 is a diagram for comparing and describing ranging using an STS and ranging not using an STS.

FIG. 7 is a diagram for comparing and describing ranging using an STS and ranging not using an STS.

Referring to FIG. 7, regarding a case 702 of first ranging using a preamble instead of an STS, a SYNC Code Co that is a same preamble code may be used for each slot. On the other hand, regarding a case 704 of second ranging using an STS, different STS codes may be used for each slot. For example, regarding the case 704 of the second ranging, a first STS code STS Code Co through an N-1$^{th}$ code STS Code $C_{N-1\ may}$ be used respectively for N slots.

When a first device Device1 and a second device Device2 perform UWB ranging, a UWB ranging signal may be transmitted from the first device Device1 to the second device Device2 via a direct path or transmitted to the second device Device2 after being reflected at a wall.

The second device Device2 may receive a UWB signal transmitted from the first device Device1 via a multipath. The multipath may include a line of sight (LOS) path 752 that is a path in which the UWB signal transmitted from the first device Device1 is directly transmitted to the second device Device2 without being reflected at an obstacle, and a reflection path 754 that is a path in which the UWB signal transmitted from the first device Device1 is transmitted to the second device Device2 after being reflected at an obstacle. The LOS path may be referred to as a direct path.

The second device Device2 may determine a signal received through the LOS path 752 from among signals received periodically for a certain period of time, based on correlations between the received signals, and determine a distance corresponding to the determined signal.

In detail, the second device Device2 may obtain at least one channel impulse response (CIR), based on the correlations between the received signals, and determine the signal received through the LOS path 752, based on amplitude of the obtained CIR and a time point when the CIR is generated. When a plurality of CIRs are obtained, the second device Device2 may identify, as the signal received through the LOS path 752, a signal corresponding to a CIR that is generated first from among CIRs of which amplitudes are equal to or greater than a certain threshold value. The second device Device2 may determine a distance between the first device Device1 and the second device Device2, based on the speed of light and a time point when the CIR corresponding to the identified signal is generated.

As shown in FIG. 7, in the case 702 of ranging not using an STS, a same code value is used for each slot. For example, a length of one slot may be 1016 ns, the SYNC Code Co that is a same code value may be used for each slot, and the signal received via the LOS path 752 and the signal received via the reflection path 754 may both include the SYNC Code Co as the same code value for each slot.

Accordingly, even in an environment where there is no obstacle between the first device Device1 and the second device Device2 and no interference by Wi-Fi, a signal received via the reflection path 754 by being transmitted from a previous slot (or a first slot, a certain slot) may be identified as a signal received via the LOS path 752 by being transmitted from a current slot (or a second slot, next slot). This may be referred to as an issue in which a fake first path is detected. As described above, when the signal actually received via the reflection path 754 is identified as the signal received via the LOS path 752, a distance calculated according to the identified signal may be shorter than the actual distance between the first device Device1 and the second device Device2.

Referring to a graph 720 indicating a CIR regarding ranging not using an STS, an electronic device may detect a signal corresponding to a first impulse response 722 and a signal corresponding to a second impulse response 724, of which amplitudes of CIRs are equal to or greater than certain threshold values. The signal corresponding to the first impulse response 722 is a signal detected as an STS is not used, and the electronic device may determine the signal corresponding to the first impulse response 722 that is generated earlier in time as the signal received via the LOS path 752, and thus a fake first path may be detected.

Regarding the case 704 of ranging using an STS, different code values are used for each slot, and thus the signal received via the reflection path 754 by being transmitted from the previous slot and the signal received via the LOS path 752 by being transmitted from the current slot do not use a same STS code. Accordingly, in the case 704 of ranging using an STS, a fake first path is not detected, and thus reliability of ranging is higher than the case 702 of ranging not using an STS.

Referring to a graph 730 indicating a CIR regarding ranging using an STS, the electronic device may detect a signal corresponding to one impulse response 732 in which amplitude is equal to or greater than a certain threshold value, and a fake first path is not generated.

According to an embodiment of the disclosure, the electronic device may perform fixed STS generation to supplement issues of dynamic STS and issues of ranging not using an STS. The fixed STS generation may be referred to as static STS generation, and will be referred to as static STS generation hereinbelow.

In detail, UWB ranging is performed based on an STS for static STS, and thus accuracy and reliability may be improved compared to the ranging using a preamble described above with reference to FIG. 7.

Regarding a static STS, a pre-determined key value may be fetched and used instead of using a key value generated by a security element, so as to generate an STS, unlike a dynamic STS. For example, the key value used for the static STS may be a value pre-determined according to the FIRA standard, a value included in a Bluetooth low energy (BLE) advertising packet, or a value obtained via a quick response (QR) code. A separate security element is not required for the static STS, and thus complexity and performance deterioration of an electronic device, which occur due to a security element, may be prevented.

Also, regarding the static STS, slot count information for generating different STSs for each slot may be initialized for each round, unlike the dynamic STS. As a result, a group of first STSs regarding a first round and a group of second STSs regarding a second round may become the same, and thus quicker processing may be enabled.

In detail, when STS groups respectively corresponding to a plurality of rounds are the same, a controllee does not require physical STS index information including a count value increasing for each slot, and is able to pre-determine an STS pattern regarding following rounds, based on an STS group for an initial round, and thus quick processing is possible.

Also, regarding the static STS, an STS may be generated by receiving information associated with a vendor, via a UWB command interface (UCI). Regarding the static STS, a pre-set key value is used and thus an external attacker is able to easily identify a key value. Accordingly, an STS is generated based on a value pre-set according to the vendor, thereby reinforcing security. In detail, the information associated with the vendor varies according to the vendor and an input value for static STS generation varies, and thus security may be secured even when the pre-set key value is used, because different STSs are generated. For example, as described above, the pre-set key value may be a value pre-determined according to the FIRA standard, a value included in a BLE advertising packet, or a value obtained via a QR code.

Hereinafter, static STS generation according to an embodiment will be described in detail with reference to FIG. 8.

Figure 8:
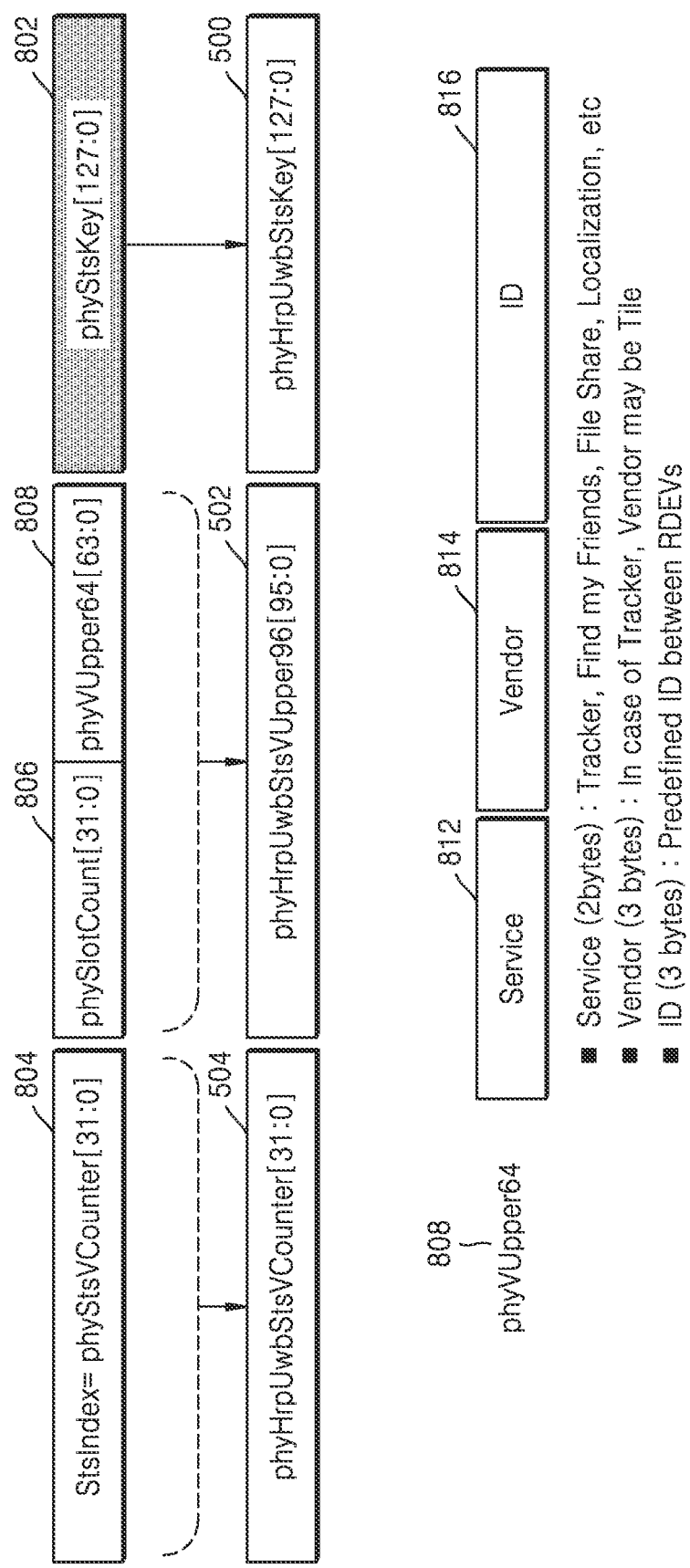
FIG. 8 is a diagram for describing static STS generation according to an embodiment.

FIG. 8 is a diagram for describing static STS generation according to an embodiment.

FIG. 8 illustrates mapping relationships between the phyHrpUwbStsVCounter 504, the phyHrpUwbStsVUpper96 502, and the phyHrpUwbStsKey 500, which are inputs of the DRBG described above with reference to FIG. 5, and phyStsVCounter 804, phySlotCount 806, phyVUpper64 808, and phyStsKey 802, which are inputs for static STS generation.

An electronic device may perform the static STS generation by using the DRBG described above with reference to FIG. 5. The inputs of the DRBG for the static STS generation may include the phyStsVCounter 804 indicating STS count information associated with the number of outputs of the DRBG, the phySlotCount 806 indicating slot count information for generating different STSs for each slot, the phyVUpper64 808 indicating upper bit information including at least one parameter pre-configured via a UCI, and the phyStsKey 802 indicating key information including a constant key value.

The phyStsVCounter 804, the phySlotCount 806, the phyVUpper64 808, and the phyStsKey 802 are only names for distinguishing factors, and configurations having different names but performing same functions do not depart from the scope of the disclosure.

The phyStsVCounter 804 is a parameter indicating a counter value increasing for each repetition of the DRBG, and may be mapped to the phyHrpUwbStsVCounter 504 of FIG. 5. Like the phyHrpUwbStsVCounter 504, the phyStsVCounter 804 may include data of 32 bits. According to an embodiment, the phyStsVCounter 804 may be initialized for each slot.

The phySlotCount 806 is a parameter indicating a counter value increasing for each slot, and may include data of 32 bits. Regarding the static STS generation, the counter value of phySlotCount 806 may increase for each slot after being initialized to a pre-determined initial value at a point of ranging session, and may be initialized for each round. The phySlotCount 806 may be referred to as cryptoStsIndex[31:0].

According to an embodiment, regarding the static STS generation, the phySlotCount 806 is initialized for each round unlike the dynamic STS generation, and thus groups of STSs respectively corresponding to a plurality of rounds may be the same. Accordingly, processing may be easier than a dynamic STS.

The phyVUpper64 808 may be information received via the UCI. For example, the electronic device may be capable of receiving the phyVUpper64 808 from a host device via the UCI, and the host device may be a device providing services associated with various applications. The phyVUpper64 808 may be referred to as vUpper64.

The phyVUpper64 808 may include at least one parameter of 64 bits. Referring to FIG. 8, the phyVUpper64 808 may include a service-associated parameter 812, a vendor-associated parameter 814, and a parameter 816 regarding identifications (IDs) of ranging devices.

The service-associated parameter 812 may indicate information about an application associated with UWB ranging between the first electronic device 201 and the second electronic device 202. For example, when the UWB ranging between the first electronic device 201 and the second electronic device 202 is performed via execution of a position tracking application, the service-associated parameter 812 may indicate identification information for identifying the position tracking application. For example, the services may include not only position tracking, but also find my friend, file share, localization, and the like.

The vendor-associated parameter 814 may indicate an ID of a vendor. For example, when the UWB ranging between the first electronic device 201 and the second electronic device 202 is performed via execution of the position tracking application, the vendor-associated parameter 814 may indicate an ID of a vendor of the position tracking application. For example, the vendor-associated parameter may include VENDOR_ID.

The VENDOR_ID is a unique ID for the vendor and may be a parameter used to configure vUpper64[15:0] for a static STS. The phyVUpper64 808 may further include STATIC_STS_IV, and the STATIC_STS_IV may be an arbitrary value defined by the vendor for a static STS configuration. The STATIC_STS_IV may be a parameter used to configure vUpper64[63:16].

The parameter 816 regarding IDs of the ranging devices may indicate IDs predefined between apparatuses performing UWB ranging. For example, when the first electronic device 201 and the second electronic device 202 perform the UWB ranging, the parameter 816 regarding the IDs of the ranging devices may indicate an ID of the first electronic device 201 and an ID of the second electronic device 202. A ranging device may be referred to as an RDEV.

Data of 96 bits including consecutive values of the phyVUpper64 808 and phySlotCount 806 may be mapped to the phyHrpUwbStsVUpper96 502 of FIG. 5. For example, the phyVUpper64 808 may correspond to upper 64 bits of the phyHrpUwbStsVUpper96 502, and the phySlotCount 806 may correspond to lower 32 bits of the phyHrpUwbStsVUpper96 502.

The phyStsKey 802 may be a parameter indicating a fixed key value or a constant key value, and may include data of 128 bits. Unlike a dynamic STS, the phyStsKey 802 of the static STS is not a key value generated by a security element, but may be a key value defined by the FIRA standard, a value included in a BLE advertising packet, or a value obtained via a QR code. In detail, according to the embodiment described with reference to FIG. 6, a dynamic STS is generated by using a key value that is newly generated every time by a security element, but according to the embodiment of FIG. 8, a static STS may be generated by using a pre-defined key value. For example, a key value defined by the FIRA standard may be used.

The phyStsKey 802 may be mapped to the phyHrpUwbStsKey 500 of FIG. 5.

According to an embodiment, the electronic device may generate an STS without using a security element, thereby preventing complexity of the electronic device from increasing and performance thereof from deteriorating due to a security element.

According to an embodiment, an issue in which security may be weakened when a pre-determined key value is used without using a security element may be prevented by slot count information indicating a counter value increasing for each slot. Because it is difficult to identify an initial value of the counter value included in the slot count information from the outside, a security issue that may occur by using the pre-determined key value may be prevented by generating an STS by using the counter value increasing for each slot.

In addition, the electronic device may generate an STS by using information received via the UCI. A value included in the information received via the UCI may change depending on a vendor or a type of service provided by the vendor. Accordingly, when ranging is performed by executing a plurality of applications simultaneously, UWB rangings respectively corresponding to the plurality of applications may be distinguished from each other.

The phyStsVCounter 804 may be mapped to the phyHrpUwbStsVCounter 504, the phySlotCount 806 and the phyVUpper64 808 may be mapped to the phyHrpUwbStsVUpper96 502, the phyStsKey 802 may be mapped to the phyHrpUwbStsKey 500, and the electronic device may perform the static STS generation by using the DRBG according to FIG. 5 after initializing an input value of the DRBG to a value mapped according to the mapping relationship described above.

According to an embodiment of the disclosure, the electronic device may perform the static STS generation, based on the phyStsVCounter 804, the phySlotCount 806, the phyVUpper64 808, and the phyStsKey 802.

The phyVUpper64 808 received from the host device via the UCI, and the phyStsKey 802 that is the value pre-determined by the FIRA standard, the value included in the BLE advertising packet, or the value obtained via the QR code, may be constant values. The phyStsVCounter 804 including the counter value increasing for each repetition of the DRBG, and the phySlotCount 806 including the counter value increasing for each slot may be variable values.

The electronic device may initialize the phyStsVCounter 804 corresponding to a variable value for each slot, and initialize the phySlotCount 806 corresponding to a variable value for each round. The electronic device may periodically initialize a parameter corresponding to a variable value from among parameters corresponding to inputs of the DRBG, thereby generating different STSs for each of a plurality of slots included in one round and at the same time, generating STSs such that STS groups respectively corresponding to a plurality of rounds are the same.

In detail, from among the inputs of DRBG, the phyVUpper64 808 and the phyStsKey 802 are constant values, and the phyStsVCounter 804 is initialized for each slot, and thus the phyVUpper64 808, the phyStsKey 802, and the phyStsVCounter 804 may have same values for each slot. The phySlotCount 806 includes the counter value increasing for each slot, and thus the static STS generation performed by the electronic device may provide different STSs for each slot according to the phySlotCount 806. Accordingly, a plurality of first STSs respectively corresponding to a plurality of slots included in one round may be different from each other.

Because the phySlotCount 806 is initialized for each round, a group of a plurality of first STSs respectively corresponding to a plurality of slots included in a first round may be the same as a group of a plurality of second STSs respectively corresponding to a plurality of slots included in a second round.

According to an embodiment of the disclosure, because different STSs may be generated for each of a plurality of slots included in a round according to the static STS generation, reliable ranging may be secured. Also, because STS groups respectively corresponding to a plurality of rounds are the same, quicker processing may be possible. In addition, because an STS is generated by using a pre-determined key value without a security element, ranging may be performed with low cost and high performance.

According to another embodiment of the disclosure, the phySlotCount 806 may include a fixed value. For example, the phySlotCount 806 may be a constant value having a pre-determined value, instead of a counter value increasing for each slot. According to an embodiment, from among the inputs of the DRBG, the phyVUpper64 808, the phyStsKey 802, and the phySlotCount 806 are constant values, and the phyStsVCounter 804 is initialized for each slot, and thus the phyVUpper64 808, the phyStsKey 802, the phySlotCount 806, and the phyStsVCounter 804 may have same values for each slot. Accordingly, simplification of operations by which the electronic device generates an STS may be maximized.

Figure 9:
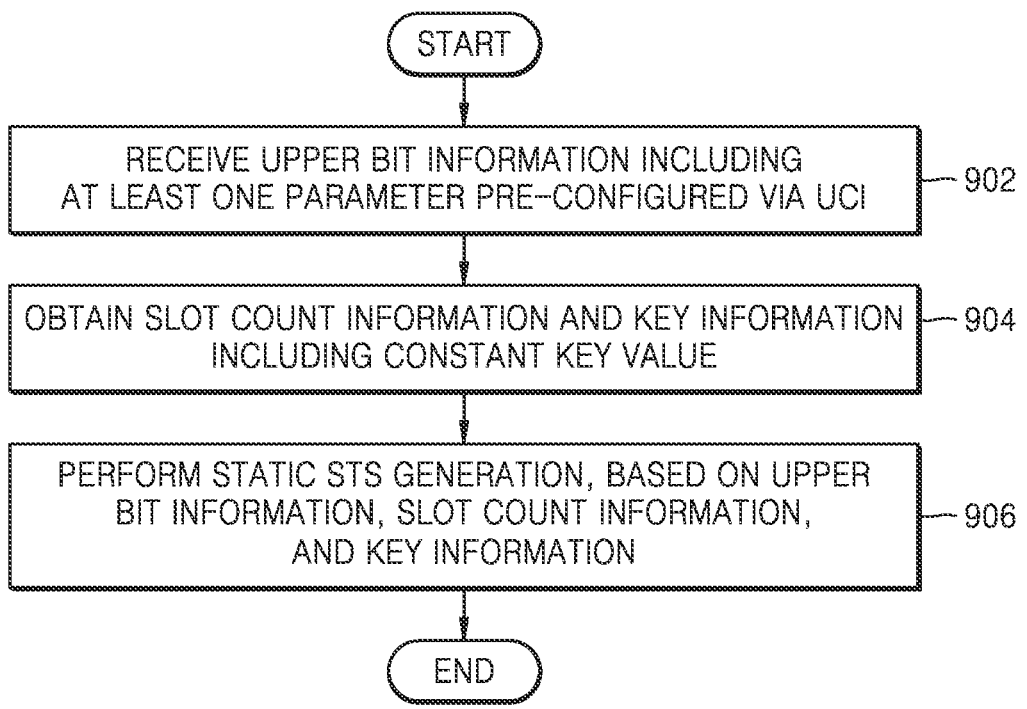
FIG. 9 is a flowchart of an operation method of an electronic device, according to an embodiment of the disclosure.

FIG. 9 is a flowchart of an operation method of an electronic device, according to an embodiment of the disclosure.

In operation 902, the electronic device may receive upper bit information including at least one parameter pre-configured via a UCI. For example, the upper bit information may include a parameter indicating an ID of a vendor. The upper bit information may include phyVUpper64, and the parameter indicating the ID of the vendor may include VENDOR_ID.

In operation 904, the electronic device may obtain slot count information for generating different STSs for each slot, and key information including a constant key value. The slot count information may include a count value increasing by a value of 1 for each slot, and the count value may be initialized for each round. For example, the slot count information may include at least one of phySlotCount or cryptoStsIndex. Also, the key information may include phyStsKey. The key information including a constant key value may include a value pre-determined by the FIRA standard, a value included in a BLE advertising packet, or a value obtained via a QR code. The value included in the BLE advertising packet and the value obtained via the QR code may be respectively transmitted through a first path and a second path connecting the electronic device and a host device via the UCI.

In operation 906, the electronic device may perform static STS generation, based on the upper bit information, the slot count information, and the key information. A DRBG is used for the static STS generation, and inputs of the DRBG may include the upper bit information, the slot count information, and the key information. The input of the DRBG may further include STS count information associated with the number of outputs of the DRBG, and the STS count information may be initialized for each slot. For example, the STS count information may include phyStsVCounter.

When the electronic device according to an embodiment of the disclosure performs the static STS generation, STSs respectively corresponding to a plurality of slots included in each of a plurality of rounds may be different from each other, and a plurality of first STSs associated with a first round and a plurality of second STSs associated with a second round may be the same.

Figure 10:
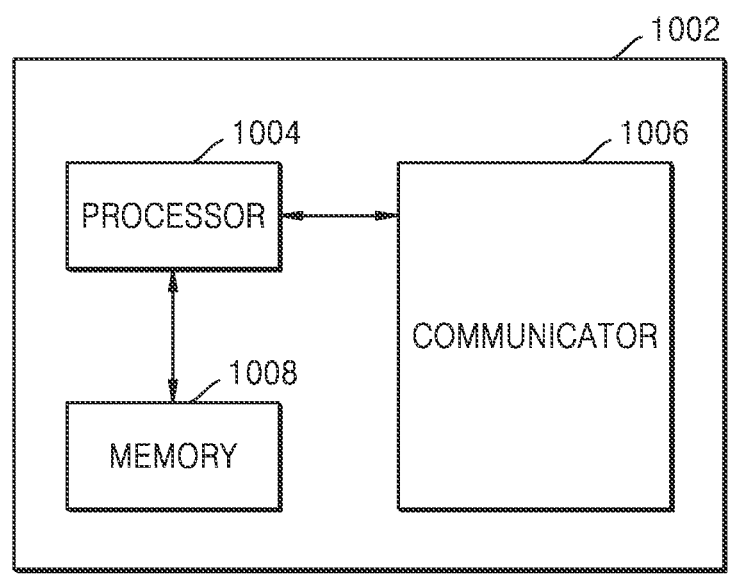
FIG. 10 is a block diagram of an electronic device according to an embodiment.

FIG. 10 is a block diagram of an electronic device according to an embodiment.

An electronic device 1002 may include a processor 1004, a communicator 1006, and a memory 1008. However, the electronic device 1002 may include more or fewer components than those shown in FIG. 10.

In FIG. 10, the electronic device 1002 includes one processor, but an embodiment is not limited thereto and the electronic device 1002 may include a plurality of processors. Hereinafter, at least some of operations and functions of the processor 1004 described below may be performed by a plurality of processors. The electronic device 1002 of FIG. 10 may perform an operation method according to various embodiments of the disclosure, and descriptions of FIGS. 1 through 9 may be applied thereto.

The communicator 1006 according to an embodiment of the disclosure may perform wired/wireless communication with another device or a network. In this regard, the communicator 1006 may include a communication module supporting at least one of various wired/wireless communication methods. For example, the communication module may be in a form of a chipset or may be a sticker/barcode (for example, a sticker including a near-field communication (NFC) tag) including information required for communication.

The wireless communication may include, for example, at least one of cellular communication, wireless fidelity (Wi-Fi), Wi-Fi direct, Bluetooth, ultra-wide band (UWB), or NFC. The wired communication may include, for example, at least one of universal serial bus (USB) or high-definition multimedia interface (HDMI).

According to an embodiment, the communicator 1006 may include a communication module for short range communication. For example, the communicator 1006 may include a communication module for performing various short range communications, such as infrared communication, magnetic secure transmission (MST), and magnetic secure communication, in addition to UWB, Wi-Fi, Wi-Fi direct, Bluetooth, and NFC described above.

The communicator 1006 according to an embodiment of the disclosure may communicate with a second electronic device by using a first communication method or a second communication method. For example, the second communication method may be a UWB communication method, and the first communication method may be a communication method different from the second communication method. For example, the first communication method may be a Bluetooth communication method, but is not limited thereto.

According to an embodiment, the communicator 1006 may include a UCI, and may receive upper bit information including at least one parameter pre-configured via the UCI. For example, the upper bit information may include a parameter indicating an ID of a vendor. The upper bit information may include phyVUpper64, and the parameter indicating the ID of the vendor may include VENDOR_ID.

The processor 1004 according to an embodiment of the disclosure may execute a program stored in the memory 1008 to control overall operations of the electronic device 1002, and may include at least one of processors, such as a central processing unit (CPU) and a graphics processing unit (GPU). The processor 1004 may control other components included in the electronic device 1002 to perform UWB ranging.

According to an embodiment, the processor 1004 may obtain slot count information for generating different STSs for each slot, and key information including a constant key value. The slot count information may include a count value increasing by a value of 1 for each slot, and the count value may be initialized for each round. For example, the slot count information may include at least one of phySlotCount or cryptoStsIndex. Also, the key information may include phyStsKey.

The processor 1004 may perform static STS generation, based on the upper bit information, the slot count information, and the key information. A DRBG is used for the static STS generation, and inputs of the DRBG may include the upper bit information, the slot count information, and the key information. The input of the DRBG may further include STS count information associated with the number of outputs of the DRBG, and the STS count information may be initialized for each slot. For example, the STS count information may include phyStsVCounter.

When the processor 1004 according to an embodiment of the disclosure performs the static STS generation, STSs respectively corresponding to a plurality of slots included in each of a plurality of rounds may be different from each other, and a plurality of first STSs associated with a first round and a plurality of second STSs associated with a second round may be the same.

Embodiments of the disclosure may be implemented as a software program that includes instructions stored on computer-readable storage media.

A computer is an apparatus capable of calling a stored instruction from a storage medium and operating according to the embodiment of the disclosure according to the called instruction, and may include an image transmitting apparatus and an image receiving apparatus according to embodiments of the disclosure.

The computer-readable storage medium may be provided in the form of a non-transitory storage medium. The term "non-transitory" only means that a storage medium does not include a signal and is tangible, and does not distinguish whether data is stored in the storage medium semi-permanently or temporarily.

Furthermore, an electronic device and method according to embodiments of the disclosure may be provided by being included in a computer program product. The computer program products are products that can be traded between sellers and buyers.

The computer program product may include a software program or a computer-readable storage medium storing a software program. For example, the computer program product may include a product (for example, a downloadable application) in a form of a software program that is electronically distributable through a manufacturer of the electronic device or an electronic market (for example, Google PlayStore™ or AppStore™). For electronic distribution, at least a part of the software program may be stored in the storage medium or temporarily generated. In this case, the storage medium may be a storage medium of a server of a manufacturer, a server of an electronic market, or a relay server that temporarily stores the software program.

The computer program product may include a storage medium of a server or a storage medium of a terminal, in a system including a server and a terminal (for example, an image transmitting apparatus or an image receiving apparatus). Alternatively, when there is a third device, e.g., a smartphone, that communicates with a server or a terminal, the computer program product may include a storage medium of the third device. Alternatively, the computer program product may include the software program transmitted from the server to the terminal or the third device, or transmitted from the third device to the terminal.

In this case, one of the server, the terminal, and the third device may perform a method according to embodiments of the disclosure by executing the computer program product. Alternatively, two or more of the server, the terminal, and the third device may execute the computer program product to perform the method according to the embodiments of the disclosure in a distributed fashion.

For example, a server, for example, a cloud server or an artificial intelligence server, may execute the computer program product stored in the server to control the terminal communicatively connected to the server to perform the method according to the embodiments of the disclosure.

In another example, the third device may execute the computer program product to control the terminal communicatively connected to the third device to perform the method according to the embodiment of the disclosure. In detail, the third device may remotely control an image transmitting apparatus and an image receiving apparatus to transmit or receive a packet image.

When the third device executes the computer program product, the third device may download the computer program product from the server and execute the downloaded computer program product. Alternatively, the third device may execute a computer program product provided in a preloaded state to perform the method according to the embodiments of the disclosure.

Various embodiments of the disclosure have been described above. The description of the disclosure above is only for illustrative purposes and embodiments of the disclosure are not limited to the above-described embodiments of the disclosure. It will be understood by one of ordinary skill in the art that various changes in form and details may be readily made therein without departing from essential features and the scope of the disclosure as defined by the following claims. The scope of the disclosure is defined by the appended claims rather than the detailed description, and all changes or modifications within the scope of the appended claims and their equivalents will be construed as being included in the scope of the disclosure.

The invention claimed is:

1. A method performed by an electronic device for performing ultra wide band (UWB) communication, the method comprising:
   receiving information including a parameter indicating an identification of a vendor, via a UWB command interface (UCI);
   identifying information associated with a value increasing for each slot and information associated with a fixed constant key value for a static scrambled timestamp sequence (STS); and
   performing a static STS generation, based on the information including the parameter indicating the identification of the vendor, the information associated with the value increasing for each slot and the key information associated with the fixed constant key value.

2. The method of claim 1,
   wherein the static STS generation is performed for a plurality of rounds, and
   wherein the value increasing for each slot is initialized for each round during the static STS generation.

3. The method of claim 1, wherein a deterministic random bit generator (DRBG) is used for the static STS generation, and
   wherein an input of the DRBG comprises the information including the parameter indicating the identification of the vendor, the information associated with the value increasing for each slot and the information associated with the fixed constant key value.

4. The method of claim 3, wherein the input of the DRBG further comprises STS count information associated with a number of outputs of the DRBG.

5. The method of claim 4, wherein the STS count information is initialized for each slot.

6. The method of claim 1, wherein STSs respectively corresponding to a plurality of slots included in each of a plurality of rounds are different from each other, and
   wherein a plurality of first STSs associated with a first round and a plurality of second STSs associated with a second round are the same.

7. An electronic device for performing ultra wide band (UWB) communication, the electronic device comprising:
   a transceiver; and
   at least one processor coupled to the transceiver and configured to:
      receive, via the transceiver, information including a parameter indicating an identification of a vendor, via a UWB command interface (UCI),
      identify information associated with a value increasing for each slot and information associated with a fixed constant key value for a static scrambled timestamp sequence (STS), and
      perform a static STS generation, based on the information including the parameter indicating the identification of the vendor, the information associated with the value increasing for each slot and the information associated with the fixed constant key value.

8. The electronic device of claim 7, wherein the static STS generation is performed for a plurality of rounds, and
wherein the value increasing for each slot is initialized for each round during the static STS generation.

9. The electronic device of claim 7, wherein the at least one processor comprises a deterministic random bit generator (DRBG) for the static STS generation, and
wherein an input of the DRBG comprises the information including the parameter indicating the identification of the vendor, the information associated with the value increasing for each slot, and the information associated with the fixed constant key value.

10. The electronic device of claim 9, wherein the input of the DRBG further comprises STS count information associated with a number of outputs of the DRBG, and
wherein the STS count information is initialized for each slot.

11. The electronic device of claim 7, wherein STSs respectively corresponding to a plurality of slots included in each of a plurality of rounds are different from each other, and
wherein a plurality of first STSs associated with a first round and a plurality of second STSs associated with a second round are the same.

\* \* \* \* \*